United States Patent [19]
Larimer

[11] Patent Number: 5,239,752
[45] Date of Patent: Aug. 31, 1993

[54] APPARATUS AND TECHNIQUE FOR ASSEMBLING AN ANTI-FRICTION BEARING

[76] Inventor: Thomas L. Larimer, Rte. 1, Box 562, Wilcox, Ariz. 85643

[21] Appl. No.: 769,059

[22] Filed: Sep. 30, 1991

[51] Int. Cl.⁵ .............................................. F16C 43/06
[52] U.S. Cl. .......................... 29/898.061; 29/898.062; 29/898.064; 29/468; 29/724
[58] Field of Search ...................... 29/898.06, 898.061, 29/898.062, 898.064, 724, 898.09, 464, 468, DIG. 95; 209/214, 215

[56] References Cited

U.S. PATENT DOCUMENTS

| | | | |
|---|---|---|---|
| 967,519 | 8/1910 | Hess | 29/898.062 |
| 2,633,627 | 4/1953 | Olmstead | 29/898.062 |
| 3,882,583 | 5/1975 | Thacker et al. | 29/898.061 |

Primary Examiner—Mark Rosenbaum
Assistant Examiner—S. Thomas Hughes
Attorney, Agent, or Firm—Christopher Duffy

[57] ABSTRACT

A ball bearing is balanced by orbiting the balls in the gap between the race defining members, magnetically causing the orbiting balls to assume a spaced symmetrical array about the gap, and then inserting a keeper device in the spaces between pairs of balls, to preserve the array for the finished bearing when the set of balls ceases orbiting in the gap. Earlier, the balls were inserted between the race defining members, in preparation for the balancing operation, by angularly deflecting the relatively outer race defining member from the plane of relative rotation until the balls could be inserted through an end opening of the gap, at one circumferential side thereof.

35 Claims, 2 Drawing Sheets

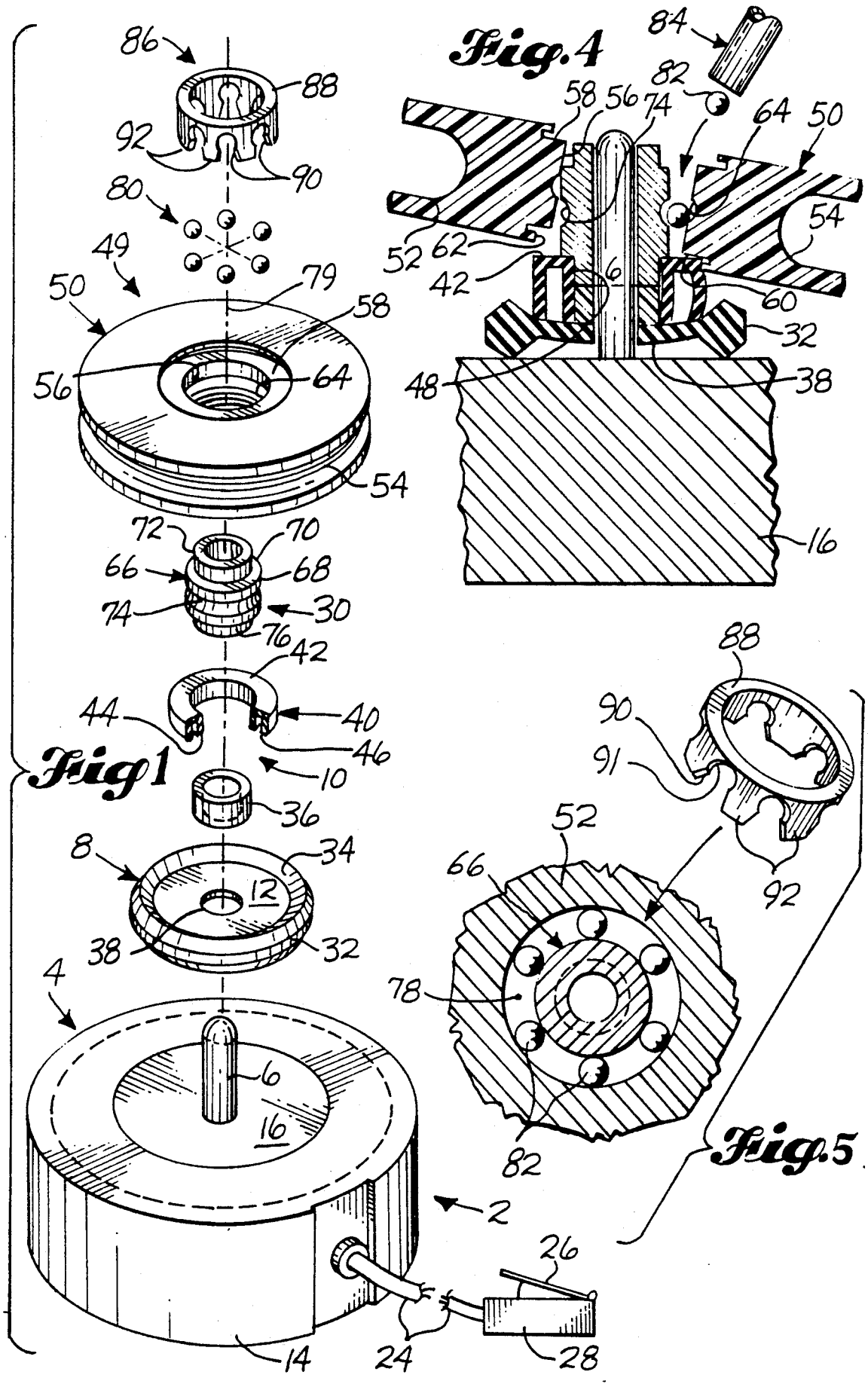

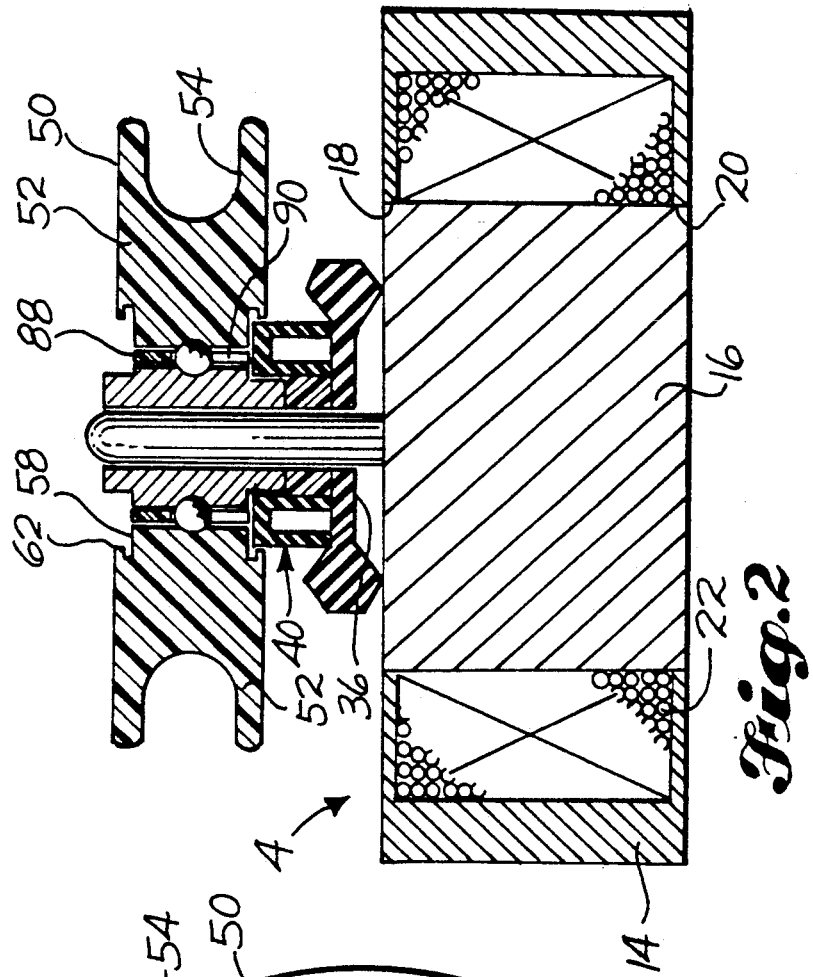
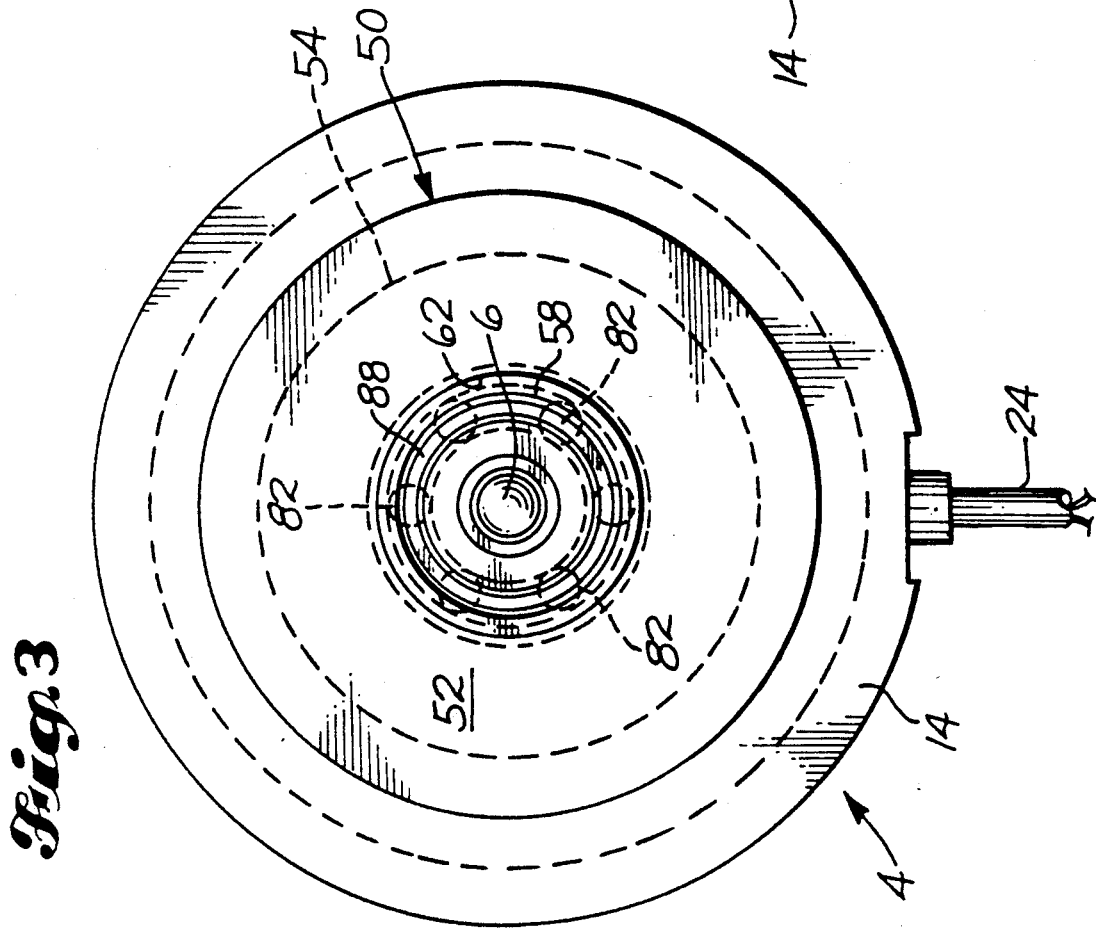

APPARATUS AND TECHNIQUE FOR ASSEMBLING AN ANTI-FRICTION BEARING

DESCRIPTION

1. Technical Field

The present invention relates to an apparatus and technique for assembling an anti-friction bearing comprised of a pair of relatively rotatable outer and inner race defining members which are concentrically arranged about an axis of revolution in a plane of relative rotation transverse thereof, and spaced apart by an annular gap between the mutually opposing relatively inner and outer peripheries thereof, but interconnected by a set of three or more rolling elements which are rotatably interposed in the gap to convert the sliding friction of the members to rotating friction when the members are rotated in relation to one other. More particularly, the invention relates to the balancing of such a bearing, that is, the positioning and retention of the rolling elements in symmetrical array about the gap so that the members will remain uniformly spaced apart from one another when they are rotated in relation to one another.

2. Background Art

Various apparatus and techniques have been disclosed for assembling and balancing an anti-friction bearing, but none has accomplished the task of balancing the bearing without the use of some mechanical device for positioning the rolling elements in symmetrical array about the gap while a set of spacer elements was inserted in the spaces between pairs of rolling elements to preserve the array for the finished bearing. In U.S. Pat. No. 1,533,746, for example, Lott mounted a keeper device and a set of rolling elements around the inner periphery of the relatively outer race defining member to form a subassembly of the three components, and then magnetically trapped the rolling elements in the keeper device while he inserted the relatively inner race defining member in the subassembly to preserve the symmetrical array of the elements after they were released from the magnetic field. Later, in U.S. Pat. No. 3,135,041 and 3,882,583, Knobel and Thacker et al, respectively, used spreader devices to distribute the elements in symmetrical array about the gap while a keeper device was inserted in the subassembly to preserve the array. Thacker et al also used relative rotation between the race defining members to aid the rolling elements in finding their respective positions at the rim of their spreader device, but as in Lott, their aim simply was to position the elements with one mechanical device while another was added to preserve the array for the finished bearing.

DISCLOSURE OF THE INVENTION

The present invention positions the rolling elements magnetically, so as to make it possible to insert spacer elements between the pairs of rolling elements without the necessity for interposing any other mechanical device in the gap. According to the invention, a subassembly of race defining members and rolling elements, is mounted on the axis of rotation of a rotary jig, and in the subassembly, the mutually opposing peripheries of the pair of members not only define mutually opposing races which have corresponding but relatively inverted surfaces of revolution about the axis at the bottoms thereof, but in addition, the annular gap between the mutually opposing peripheries of the members is open-ended at one axial end of the pair of members, and the bodies of the rolling elements have surfaces of revolution at the respective outer peripheries thereof which are complementary to the surfaces of the races, and are rotatably interengaged between the surfaces of the races so that they can orbit about the gap to assume positions opposite the end opening of the gap when the members are rotated in relation to one another. With the subassembly so mounted and constituted, the set of rolling elements is induced to orbit about the axis in the gap, and while they are orbiting in the gap, the elements are subjected to a magnetic field so that they will assume positions in which they are spaced apart from one another in symmetrical array about the gap. Then a set of spacer elements that is disposed in the end opening of the gap, is inserted in the spaces between pairs of rolling elements to preserve the symmetrical array of the rolling elements for the finished bearing when the set of rolling elements ceases orbiting in the gap. Preferably, the set of rolling elements is induced to orbit about the axis in the gap, and then the rolling elements are subjected to the magnetic field to space the rolling elements apart from one another in symmetrical array about the gap. Also, the sets of rolling elements and spacer elements are preferably brought into relatively stationary condition orbitally of the axis before the set of spacer elements is inserted in the spaces between pairs of rolling elements. The set of spacer elements is also preferably inserted in the spaces between pairs of rolling elements while the gap is subjected to the magnetic field.

In many of the presently preferred embodiments of the invention, the set of rolling elements is induced to orbit about the axis in the gap by rotating the race defining members in relation to one another, and preferably, while an abutment is engaged with the respective race defining members to maintain the races in mutual opposition to one another. In addition, when the rolling elements are spaced apart from one another in symmetrical array about the gap, the relative rotation between the race defining members is actually terminated, and then from a point outside the gap, the set of spacer elements is inserted first into the end opening of the gap and then into the spaces between pairs of rolling elements while the gap remains subjected to the magnetic field. In certain of these embodiments, the spacer elements are substantially simultaneously inserted into the spaces between pairs of rolling elements by a drive member interconnected with the respective spacer elements. For example, in some embodiments, the surfaces of the races are part spherical in axial planes of the members, and the rolling elements take the form of spherical balls whose diameters correspond to the width of the gap between the bottoms of the races. Meanwhile, in the process, the drive member is annular and has spaced parallel legs outstanding on one axial end thereof which are inserted through the spaces between pairs of balls to take up positions adjacent the other axial end of the pair of race defining members when the drive member itself is disposed in the end opening of the gap.

In some of the presently preferred embodiments of the invention, the jig has a spindle on the axis thereof, the relatively inner race defining member has an axial recess therein, and the subassembly is mounted about the spindle while the race defining members are rotated in relation to one another. In certain embodiments, moreover, the jig has a tailstock at one axial end of the spindle, and the subassembly is telescopically engaged about the spindle in abutment with the tailstock to maintain the races in mutual opposition to one another while the members are rotated in relation to one another.

In one group of embodiments, the pair of race defining members is loosely assembled in concentric arrangement about the axis of the jig in the plane of relative rotation, and spaced apart from one another by the aforesaid open ended gap between the peripheries thereof, and then the set of rolling elements is inserted in the loose assembly of members through one end opening of the gap, and rotatably interengaged between the members at the surfaces of the races to interconnect the members on the jig itself. Furthermore, in certain of this group, the set of rolling elements is inserted in the gap by angularly deflecting the relatively outer race defining member from the plane of relative rotation axially of the jig to the extent that the set of rolling elements can be inserted in the gap at a point in the one end opening thereof, and then the relatively outer member is restored to the plane of relative rotation to rotatably interengage the rolling elements between the members at the surfaces of the races.

In one special group of embodiments wherein the jig has a spindle on the axis thereof and a tailstock at one axial end of the spindle, the tailstock has an annular surface about the axis at a radius of the relatively outer race defining member, and the surface is resiliently deflectable axially of the jig by applying an axial force to the same at a point on the circumference thereof. Meanwhile, the relatively inner race defining member has an axial recess therein and the subassembly is telescopically engaged about the spindle and abutted against the point on the surface of the tailstock with sufficient force axially of the jig to angularly deflect the relatively outer race defining member from the plane of relative rotation to the extent that the set of rolling elements can be inserted in the gap at a corresponding point in the one end opening thereof. Then the force is released to enable the bias at the surface of the tail-stock to restore the relatively outer member to the plane of relative rotation to rotatably interengage the rolling elements between the members at the surfaces of the races.

Often, to space the rolling elements apart from one another in symmetrical array about the gap, an electric coil is arranged about the axis of the jig in coaxial relationship with the subassembly, and electrically activated to generate a magnetic field about a magnetizable core disposed within the coil when the rolling elements are orbiting about the axis in the gap. For example, in those embodiments wherein a spindle and a tailstock are used, the coil and core are concentrically arranged about one another on the opposite side of the tailstock from the spindle, axially of the jig. In certain of these embodiments, moreover, the jig is arranged so as to have a vertical axis of revolution, and the tailstock takes the form of an annular pedestal which is supported on a magnetizable core having an electric coil wrapped thereabout, and a spindle upstanding thereon in the pedestal.

More generally, the inventive apparatus comprises a rotary jig having an axis of revolution, means whereby the subassembly is mountable on the jig in coaxial relationship therewith, means whereby the set of rolling elements can be induced to orbit about the axis of the jig in the gap, means whereby the set of rolling elements can be subjected to a magnetic field while they are orbiting in the gap, so that they will assume positions in which they are spaced apart from one another in symmetrical array about the gap, and means whereby a set of spacer elements that is disposed in the end opening of the gap, can be inserted in the spaces between pairs of rolling elements to preserve the symmetrical array of the rolling elements for the finished bearing when the set of rolling elements ceases orbiting in the gap.

As indicated, when the race defining members are rotated in relation to one another to induce the set of rolling elements to orbit about the axis of the jig in the gap, the apparatus often further comprises abutment means which are engageable with the respective race defining members to maintain the races in mutual opposition to one another while the race defining members are rotating in relation to one another. Similarly, when the relatively inner race defining member has an axial recess therein, the jig often has a spindle on the axis thereof about which the subassembly is mounted when the members are rotated in relation to one another.

In certain embodiments of the apparatus, the abutment means take the form of a tailstock which is disposed on the axis of the jig and has an axially extending spindle thereon about which the subassembly is telescopically engaged in abutment with the tailstock when the members are rotated in relation to one another. When the subassembly is formed on the jig itself, the tailstock often has an annular surface thereon which is disposed about the axis of the jig at a radius of the relatively outer race defining member, and resiliently deflectable axially of the jig when an axial force is applied to the same at a point on the circumference thereof, so that the relatively outer member can be angularly deflected from the plane of relative rotation by such a force for the insertion of the rolling elements in the assembly, and then restored to the plane to interengage the elements between the members when the force is released as described. In some embodiments, the tailstock has a stop at one axial end of the spindle, and the surface of the tailstock is defined by an annular guide which is circumposed about the stop to maintain the races in mutual opposition to one another when the relatively inner race defining member is telescopically engaged about the spindle in abutment with the stop and the relatively outer race defining member is rotated in relation to the inner race defining member on the surface of the guide. In addition to the guide and stop, moreover, the tailstock may comprise a resiliently yieldable ring which is disposed on the opposite side of the guide from the spindle, and operable in the normally relaxed condition thereof to bias the surface of the guide into a plane perpendicular to the axis of the jig, but capable of bowing concavely at the inner peripheral edge portion thereof when axial forces are applied to the same through the body of the guide. The guide, meanwhile, has a resiliently compressible body which bows convexly, transverse the axis of the jig, when compressed against the inner peripheral edge portion of the ring by an axial force that is applied eccentrically of the axis to a point on the surface of the guide at one circumferential side thereof, so that the surface will deflect angularly of its plane at the one circumferencial side thereof when the relatively outer race defining member is depressed against the surface at that side.

Often, when the jig has a vertical axis of revolution, the guide takes the form of an annular pedestal that is supported on the inner peripheral edge portion of an annular saddle which has a relatively fixed outer peripheral rim and an annular membrane of resiliently flexible material cantilevered relatively inwardly therefrom about the axis of the jig to form the inner peripheral edge portion of the saddle. The body of the pedestal has an annular groove therein which forms an outer peripheral wall on the opposite side thereof from the spindle, and the outer peripheral wall of the pedestal is resiliently convexly bendable transverse the axis of the jig when the body of the pedestal is compressed against the bias of the membrane axially of the jig to angularly deflect the surface of the pedestal as indicated. The saddle, meanwhile, is supported on a magnetizable plinth having an electric coil wrapped thereabout, and a spindle upstanding thereon at the center of the saddle and the pedestal. Sometimes, the pedestal also has an annular step at the inner periphery thereof, which defines a stop for the relatively inner race defining member when the latter member has a boss thereon projecting relatively below the surface of the pedestal.

BRIEF DESCRIPTION OF THE DRAWINGS

These features will be better understood by reference to the accompanying drawings wherein one of the latter vertically oriented embodiments of the apparatus is illustrated in the context of assembling a sleeve bearing in an annular sheave.

In the drawings:

FIG. 1 is an exploded perspective view of the jig when the sheave and sleeve have been stacked on the same and equipped with rolling elements and spacer elements to form a substantially finished bearing thereon;

FIG. 2 is a vertical cross sectional view of the finished bearing on the jig;

FIG. 3 is an view of the bearing and the jig;

FIG. 4 is a part vertical cross sectional view of the jig when the sheave and sleeve have been loosely assembled on the same and the sheave has been angularly deflected from the plane of relative rotation to enable the rolling elements be added to the gap between the sheave and sleeve to form a subassembly for the bearing; and FIG. 5 is a part perspective, part cross sectional schematic view of the gap between the sheave and sleeve when the rolling elements have been spaced apart in symmetrical array about the gap and the spacer elements are about to be inserted between pairs of rolling elements to preserve the array for the finished bearing.

BEST MODE FOR CARRYING OUT THE INVENTION

Referring to the drawings, it will be seen that the jig comprises a vertically oriented tailstock 2 having a plinth-like electromagnet 4 at the bottom thereof, which in turn has a demagnetized aluminum spindle 6 upstanding at the center thereof, and an elastomeric saddle 8 and a stepped pedestal 10 sleeved in that order about the spindle and supported in a stack on the magnet, with the pedestal resting on the elastomeric membrane 12 of the saddle. The magnet 4 has a hollow cylindrical case 14 that is open ended at the top and bottom thereof, and the case is occupied in part by a disc-shaped magnetizable but non-retentive core 16 that is disposed in the hollow of the case so as to be flush with the end openings 18 and 20 thereof. The core 16 is surrounded in turn by an alternating current carrying coil 22 that is activatable through an electrical lead 24 which is mated with the case 14 at one side thereof and has a foot pedal 26-operated switch 28 interposed in the length thereof to enable the operator of the apparatus to activate and deactivate the magnet at will with his foot. The spindle 6 upstands to a height sufficient to accommodate both the superstructure 8, 10 of the tailstock and the relatively inner race defining member 30 of the bearing which is assembled on it. The saddle 8 has a relatively hard felly-like rim 32 about the perimeter thereof that is polygonal in cross section and designed not only to raise the membrane 12 above the core 16 of the magnet, but also to form a parapet 34 within which to locate the pedestal 10. The membrane 12, on the other hand, is thinner, more elastic, and therefore more resiliently deflectable at the inner peripheral edge 38 thereof, as well as annular to sleeve about the spindle 6. The pedestal 10, meanwhile, comprises a pair of annular collars 36 and 40 which are telescopically engageable about one another, and about the spindle 6 to rest on top of the membrane 12 within the parapet 34. The inner collar 36 is plastic and relatively shorter in height. The outer collar 40 is constructed of compressible/bendable elastomer material, and is shaped like a donut cutter so as to have an annular rim 42 about the top thereof with a pair of spaced annular walls 44, 46 depending therefrom at the inner and outer peripheries thereof. The outer collar 40 is also relatively taller in height so that an annular socket 48 is formed about the spindle 6 within the top of the collar 40.

The relatively outer race defining member 49 of the bearing comprises a plastic sheave 50 having an annular body 52 with a deeply inset circumferential groove 54 about the outer peripheral surface thereof. The inner peripheral surface 56 of the body is generally cylindrical, but the top and bottom ends of the surface 56 are rabbeted and undercut to provide a pair of shallow seats 58 and 60 within which to engage a pair of retainer rings (not shown) under the lips 62 thereof when the bearing is finished off, as shall be explained. The surface 56 and lips 62 are adapted, meanwhile, so that the sheave can be rested on the rim 42 of the collar 40 with the lower lip 62 thereof telescoped about the rim, and the surface 56 thereof upstanding between the walls 44, 46 of the collar 40. At its axial center, moreover, the surface 56 has a circumferential groove 64 therein which is part spherical in cross section at the bottom thereof in axial planes of the sheave.

The relatively inner race defining member 30 comprises a tubular metal sleeve 66 which has a greater dimension axially of the bearing than the body 52 of the sheave 50, but is generally cylindrically surfaced at its outer periphery 68 to correspond to the surface 56 of the sheave. Like the surface 56 of the sheave, moreover, the surface 68 of the sleeve 66 is rabbeted at the top and bottom thereof, but in this instance, the rabbets 72 form annular shoulders 70 that are coplanar with the seats 58, 60 of the sheave when the sleeve and sheave are concentrically arranged in a plane of relative rotation, as in FIG. 2. At its axial center, moreover, the surface 68 has a circumferential groove 74 therein which is also part spherical in cross section at the bottom thereof in axial planes of the sleeve, but inverted to that, 64, of the sheave. Also, dimensionally, the sleeve 66 is adapted to rest above the inner wall 44 of the collar 40 when the boss 76 formed by the rabbet 72 on the lower end of the sleeve, is telescopically engaged in the socket 48 of the pedestal 10, and the lower shoulder 70 of the sleeve is rested on the rim 42 of the collar 40. The surface 68 of the sleeve 66 also upstands between the walls 44 and 46, of the collar 40 meanwhile, but at a smaller radius than the surface 56 of the sheave, so that an annular gap 78 is formed between the two surfaces 56, 68 when the sleeve and sheave are concentrically arranged in a plane of relative rotation, as in FIG. 2.

In the process of assembling the bearing, the relatively inner and outer race defining members 30 and 50 of the bearing are concentrically arranged about the axis 79 of the jig and rested on the rim 42 of the collar 40 in preparation for the introduction of a set of rolling elements 80 to the gap 78 between the members. See FIG. 4. The rolling elements 80 take the form of spherical electrically conductive metal balls 82 which are sized to be rotatably interengaged between the grooves 64, 74 of the members and thereby interconnect the members for the finished bearing. The balls 82 are introduced to the gap 78 by depressing the right-hand circumferential side of the outer member 50 against the rim 42 of the collar 40 while some means such as a "humming-bird-feeder" type dispenser with a release mechanism having a pipette-like outlet 84 thereon, is used to discharge a predetermined number of balls into the gap at the now wider upper end opening of the same on the right-hand circumferential side of the member 50. More specifically, when the member 50 is depressed against the collar 40, the collar 40 is compressed between the member 50 and the membrane 12 of the saddle 8, and the membrane is bowed concavely by the forces on the same axially of the jig. Inasmuch as those forces are also largely transmitted over the outer peripheral wall 46 of the collar 40, the wall tends to "buckle" or convexly bow transverse the axis of the jig when the membrane takes on a steeper inclination to the axis. The greater the inclination, the greater the bow, and as seen, the combined effect readily collapses the wall 46 and enables the rim 42 of the collar to angularly deflect from the horizontal to the extent needed. Moreover, when the forces on the outer member 50 are released, the accumulated bias in the membrane and the collar readily acts to restore the member 50 to the horizontal, as the rim 42 of the collar itself resumes the horizontal. The balls, meanwhile, take up random positions between the grooves 64, 74 of the members, where they are free to orbit about the gap 78 opposite the upper end opening of the same.

With the balls 82 free to assume random positions about the gap, the resulting subassembly would not be operable were the balls not first positioned in symmetrical array about the gap, and then retained in that array for the finished bearing. Therefore, to complete the process, the balls are induced to assume a symmetrical array, and a keeper device 86 is inserted in the gap through the upper end opening thereof, to retain them in that condition. The device 86 comprises a cylindrical ring 88 which is deeply relieved at one end to form a set of axially oriented grooves 90 therein which are flared at their mouths and have part spherical recesses 91 at their bottoms. The grooves 90 are symmetrically arrayed about the ring and spaced apart from one another by a corresponding set of part annular lands or legs 92 which are sized at the top 91 to be interposed as spacer elements between pairs of the balls when the ring 88 is employed as means for inserting the legs in the spaces between balls. Meanwhile, the legs themselves are sized in length to reach into the bottom of the gap when the ring 88 itself becomes engaged in the top of the gap, flush with the upper end opening thereof between the seat 58 and the shoulder 70 of the race defining members 50, 30.

To position the balls in symmetrical array, the relatively outer member 50 is rotated, for example by hand, to induce the set of balls 82 to orbit about the axis of the subassembly; and then while the balls are orbiting, the foot pedal 26 of the switch 28 is depressed to activate the electromagnet 4 and subject the balls to the field of the same. When so subjected to the field, the orbiting balls 82 assume a symmetrical array about the gap, with spaces between the respective pairs thereof, presumably as a current is induced in each ball so that it in turn generates its own field to that effect. Then, preferably while the gap 78 is still subjected to the field of the magnet, the rotation of the outer member 50 is terminated, for example, by touching it with one hand, to bring the balls and members to a relatively stationary condition orbitally about the axis. Thereafter, preferably while the gap 78 remains under the influence of the field, the keeper device 86 is inserted downward through the top of the gap, and between the pairs of balls, to preserve the symmetrical array of the balls for the finished bearing. Commonly, the upper retainer ring (not shown) is also added to the assembly at this stage, and then the assembly is lifted from the spindle 6 to expose the underside of it, where the lower retainer ring (not shown) is added to fully complete the bearing.

The balls 82 must have a field through which to move if the desired effect is to be achieved. Therefore, the assembly cannot be subjected to the field before the balls are induced to orbit about the gap. If this happens, the balls will simply collect at one or more points in the gap, for example, at a common point on one circumferential side of the gap. On the other hand, the balls need not be subjected to the field after they have assumed a symmetrical array and are relatively stationary to the assembly. For example, even though the rotation of the outer member 50 has been terminated and the electromagnet has been deactivated, while some of the balls may, so to speak, "relax" their positions in the array, reactivation of the magnet will cause them to promptly "jump back" into position within the array. Notwithstanding this observation, however, the assembly is normally subjected to the field throughout the operation until the keeper device 86 has been fully engaged in the gap.

Stopping the rotation of the outer member 50, as opposed to allowing it to come to a halt naturally, speeds up the assembly process, and sleeve bearinged sheaves of 2" and ¾" diameter have been hand assembled in this fashion at the rate of 6 or more per minute, using either an odd or an even number of balls. However, other embodiments of the invention make it possible to achieve even higher rates of assembly on a truly high production basis, when for example, a lathe-like apparatus is used and the keeper device 86 is rotated synchronously with the balls 82 in the end opening of the gap, so that the legs 92 of the device can be rapidly inserted into the spaces between pairs of balls when the balls assume a symmetrical array about the gap.

I claim:

1. In a process of assembling an antifriction bearing in a rotary jig, the steps of:

mounting an subassembly for the bearing on an axis of revolution of the jig, comprised of a pair of relatively rotatable outer and inner race defining members which are concentrically arranged about the axis in a plane of relative rotation transverse thereof, and spaced apart from one another by an annular gap between mutually opposing relatively inner and outer peripheries thereof, but interconnected by a set of three or more rolling elements which have bodies and are rotatably interposed in the gap to convert sliding friction of the members to rotating friction when the members are rotated in relation to one another, the pair of members defining mutually opposing races on the mutually opposing peripheries thereof, which have corresponding but relatively inverted surfaces of revolution about the axis at the bottoms thereof, the annular gap between the mutually opposing peripheries of the members being open ended at one axial end of the pair of members, and the bodies of the rolling elements having surfaces of revolution at the respective outer peripheries thereof which are complementary to the surfaces of the races, and being rotatably interengaged between the surfaces of the races so that they can orbit about the gap to assume positions opposite the end opening of the gap when the members are rotated in relation to one another, inducing the set of rolling elements to orbit about the axis in the gap, subjecting the rolling elements to a magnetic field while they are orbiting in the gap, so that they will assume positions in which they are spaced apart from one another in symmetrical array about the gap, and inserting a set of spacer elements disposed in the end opening of the gap, in the spaces between pairs of rolling elements to preserve the symmetrical array of the rolling elements in a finished bearing when the set of rolling elements ceases orbiting in the gap.

2. The process according to claim 1 further comprising inducing the set of rolling elements to orbit about the axis in the gap before the rolling elements are subjected to the magnetic field to space the rolling elements apart from one another in symmetrical array about the gap.

3. The process according to claim 1 further comprising bringing the sets of rolling elements and spacer elements into relatively stationary condition orbitally of the axis before the set of spacer elements is inserted in the spaces between pairs of rolling elements.

4. The process according to claim 1 further comprising inserting the set of spacer elements in the spaces between pairs of rolling elements while the gap is subjected to the magnetic field.

5. The process according to claim 1 further comprising rotating the race defining members in relation to one another to induce the set of rolling elements to orbit about the axis in the gap.

6. The process according to claim 5 further comprising engaging in abutment with the respective race defining members to maintain the races in mutual opposition to one another while the members are rotating in relation to one another.

7. The process according to claim 5 further comprising terminating the relative rotation between the race defining members when the rolling elements are spaced apart from one another in symmetrical array about the gap, and thereafter, from a point outside the gap, inserting the set of spacer elements first into the end opening of the gap and then into the spaces between pairs of rolling elements while the gap remains subjected to the magnetic field.

8. The process according to claim 1 further comprising interconnecting a drive member with the respective spacer elements, and driving the spacer elements substantially simultaneously into the spaces between pairs of rolling elements by advancing the drive member along the axis of the jig in the direction of the opposite axial end of the pair of race defining members.

9. The process according to claim 8 wherein the surfaces of the races are part spherical in axial planes of the race defining members, the rolling elements take the form of spherical balls whose diameters correspond to the width of the gap between the bottoms of the races, the drive member is annular, the spacer elements take the form of spaced parallel legs outstanding on one axial end of the drive member, and the process further comprises driving the drive member into the end opening of the gap so as to insert the legs through the spaces between pairs of balls to take up positions adjacent the opposite axial end of the pair of race defining members.

10. The process according to claim 1 wherein the jig has a spindle on the axis thereof, the inner race defining member has an axial recess therein, and the process further comprises mounting the subassembly about the spindle, and rotating the race defining embers in relation to one another about the spindle to induce the step of rolling elements to orbit about the axis in the gap.

11. The process according to claim 10 wherein the jig has a tailstock on one axial end of the spindle, and the process further comprises telescopically engaging the subassembly about the spindle in abutment with the tailstock to maintain the races in mutual opposition to one another while the race defining members are rotated in relation to one another.

12. The process according to claim 1 further comprising loosely assembling the pair of race defining members in concentric arrangement about the axis of the jig in the plane of relative rotation, and spaced apart from one another by the aforesaid open ended gap between the peripheries thereof, inserting the set of rolling elements in the loose assembly of race defining members through one end opening of the gap, and rotatably interengaging the set of rolling elements between the race defining members at the surfaces of the races to interconnect the race defining members on the jig.

13. The process according to claim 12 further comprising angularly deflecting the outer race defining member from the plane of relative rotation axially of the jig to the extent that the set of rolling elements can be inserted in the gap at a point in the one end opening thereof, inserting the set of rolling elements in the gap at the aforesaid point, and restoring the outer race defining member to the plane of relative rotation to rotatably interengage the rolling elements between the race defining members at the surfaces of the races.

14. The process according to claim 12 wherein the jig has a spindle on the axis thereof and a tailstock at one axial end of the spindle, the tailstock has an annular surface about the axis at a radius of the outer race defining member, the surface of the tailstock is resiliently deflectable axially of the jig by applying an axial force to the same at a point on the circumference thereof, the inner race defining member has an axial recess therein, and the process further comprises telescopically engaging the subassembly about the spindle, abutting the subassembly against the aforesaid pint on the surface of the tailstock with sufficient force axially of the jig to angularly deflect the outer race defining member from the plane of relative rotation to the extent that the set of rolling elements can be inserted in the gap at a corresponding point in the one end opening thereof, inserting the set of rolling elements in the gap, and releasing the force to enable the bias at the surface of the tailstock to restore the outer race defining member to the plane of relative rotation to rotatably interengage the rolling elements between the race defining members at the surfaces of the races.

15. The process according to claim 1 further comprising arranging an electric coil having a magnetizable core disposed therewithin about the axis of the jig in coaxial relationship with the subassembly, orbiting the rolling elements about the axis in the gap, and electrically activating the coil to generate a magnetic field about the core to space the rolling elements apart from one another in symmetrical array about the gap.

16. The process according to claim 15 wherein the jig has a spindle on the axis thereof and a tailstock at one axial end of the spindle, the relatively inner race defining member has an axial recess therein, the coil and core are concentrically arranged about one another on the opposite side of the tailstock from the spindle, axially of the jig, and the process further comprises telescopically engaging the subassembly about the spindle in abutment with the tailstock to maintain the races in mutual opposition to one another, and relatively rotating the race defining members in relation to one another to induce the set of rolling elements to orbit about the axis in the gap.

17. The process according to claim 16 wherein the jig has a vertical axis of revolution, and the tailstock takes the form of a magnetizable core having an electric coil wrapped thereabout, a spindle upstanding thereon, and an annular pedestal supported on the core about the spindle.

18. In a process of assembling an anti-friction bearing in a rotary jig, the steps of:

assembling a pair of rotatable outer and inner race defining members for the bearing in concentric arrangement about an axis of revolution of the jig and in a plane of relative rotation transverse thereof, the members being spaced apart from one another by an annular gap between mutually opposing relatively inner and outer peripheries thereof, and defining mutually opposing races on the mutually opposing peripheries thereof, which have corresponding but inverted surfaces of revolution about the axis at the bottoms thereof, and the annular gap between the mutually opposing peripheries of the members being open ended at one axial end of the pair of members, engaging an abutment with the respective race defining members at the other axial end of the pair of members, to maintain the races in mutual opposition to one another when the members are rotated in relation to one another, angularly deflecting the relatively outer race defining member from the plane of relative rotation in the direction relatively toward the aforesaid other axial end of the pair of members from the one axial end thereof, to the extent that a set of rolling elements having bodies will pass through the end opening of the gap at a point therein, inserting the set of rolling elements between the members at the aforesaid point in the end opening of the gap, and restoring the relatively outer race defining member to the plane of relative rotation to rotatably interengage the rolling elements between the members at the surfaces of the races, and interconnect the pair of members so that when they are rotated in relation to one another, sliding friction of the members is converted to rotating friction by the rolling elements, the bodies of the rolling elements having surfaces of revolution at the respective outer peripheries thereof which are complementary to the surfaces of the races, and being rotatably interengaged between the surfaces of the races so that they can orbit about the gap to assume positions opiate the end opening of the gap when the members are rotated in relation to one another.

19. The process according to claim 18 wherein the jig has a spindle on the axis thereof and a tailstock at one axial end of the spindle, the tailstock has an angular surface about the axis at a radius of the outer race defining member, the surface of the tailstock is resiliently deflectable axially of the jig by applying an axial force to the same at a point on the circumference thereof, the inner race defining member has an axial recess therein, and the process further comprises telescopically engaging the pair of race defining members about the spindle, abutting the pair of race defining members against the point on the surface of the tailstock with sufficient force axially of the jig to angularly deflect the outer race defining member from the plane of relative rotation to the extent that the set of rolling elements can be inserted in the gap at a corresponding point in the end opening thereof, inserting the set of rolling elements in the gap, and releasing the force to enable the bias at the surface of the tailstock to restore the outer race defining member to the plane of relative rotation to rotatably interengage the rolling elements between the race defining members at the surfaces of the races.

20. In an apparatus with which to assemble an anti-friction bearing from a subassembly comprising a pair of relatively rotatable outer and inner race defining members which are concentrically arranged about an axis of revolution in a plane of relative rotation transverse thereof, and spaced apart from one another by an annular gap between mutually opposing relatively inner and outer peripheries thereof, but interconnected by a set of three or more rolling elements which have bodies and are rotatably interposed in the gap to convert sliding friction of the members to rotating friction when the members are rotated in relation to one another, the pair of members defining mutually opposing races on the mutually opposing peripheries thereof, which have corresponding but relatively inverted surfaces of revolution about the axis at the bottoms thereof, the annular gap between the mutually opposing peripheries of the members being open ended at one axial end of the pair of members, and the bodies of the rolling elements having surfaces of revolution at the respective outer peripheries thereof which are complementary to the surfaces of the races, and being rotatably interengaged between the surfaces of the races so that they can orbit about the gap to assume positions opposite the end opening of the gap when the members are rotated in relation to one another, a rotary jig having an axis of revolution, means for mounting the subassembly om the jig in coaxial relationship therewith, means for subjecting the rolling elements to a magnetic field while the set of rolling elements is orbiting about the axis of the jig in the gap, so that the rolling elements will assume positions in which they are spaced apart from one another in symmetrical array about the gap, and means for inserting a set of spacer elements disposed in the end opening of the gap, in the spaces between rolling elements, to preserve the symmetrical array of the rolling elements in a finished bearing when the set of rolling elements ceases orbiting in the gap.

21. The apparatus according to claim 20 wherein the race defining members are rotated in relation to one another to induce the set of rolling elements to orbit about the axis of the jig in the gap, and the apparatus further comprises abutment means which are engageable with the respective race defining members to maintain the races in mutual opposition to one another when the race defining members are rotated in relation to one another.

22. The apparatus according to claim 21 wherein the inner race defining member has an annular recess therein, and the subassembly mounting means include a spindle on the axis of the jig about which the subassembly is mounted when the members are rotated in relation to one another.

23. The apparatus according to claim 22 wherein the disposed on the axis of the jig and has an axially extending spindle thereon about which the subassembly is telescopically engaged in abutment with the tailstock when the members are rotated in relation to one another.

24. The apparatus according to claim 23 wherein the pair of race defining members are loosely assembled in concentric arrangement about the axis of the jig in the plane of relative rotation, and spaced apart from one another by the aforesaid open ended gap between the peripheries thereof, and then the set of rolling elements is inserted in the loose assembly of members through the end opening of the gap, and rotatably interengaged between the members at the surfaces of the races to interconnect the members with one another on the jig itself, and the tailstock has an annular surface thereon which is disposed about the axis of the jig at a radius of the outer race defining member and resiliently deflectable axially of the jig when an axial force is applied to the same at a point on the circumference thereof, so that the outer race defining member can be angularly deflected from the plane of relative rotation by such a force for the insertion of the rolling elements in the assembly, and then restored to the plane to interengage the elements between the members when the force is released.

25. The apparatus according to claim 24 wherein the tailstock has a stop at one axial end of the spindle, and the surface of the tailstock is defined by an annular guide which is circumposed about the stop to maintain the races in mutual opposition to one another when the inner race defining member is telescopically engaged about the spindle in abutment with the stop and the outer race defining member is rotated in relation to the inner race defining member on the surface of the guide.

26. The apparatus according to claim 20 wherein an electric coil is arranged about the axis of the jig for coaxial relationship with the subassembly, and the apparatus further comprises means for electrically activating the coil to generate an electromagnetic field about a magnetizable core disposed within the coil when the rolling elements are orbiting about the axis in the gap.

27. In an apparatus with which to assemble an antifriction bearing from a pair of relatively rotatable outer and inner race defining members and a set of rolling elements for the bearing, a rotary jig having an axis of revolution, means for assembling the pair of relatively rotatable outer and inner race defining members in concentric arrangement about the axis of revolution of the jig and in a plane of relative rotation transverse thereof, the members being spaced apart from one another by an annular gap between mutually opposing inner and outer peripheries thereof, and defining mutually opposing races on the mutually opposing peripheries thereof, which have corresponding but relatively inverted surfaces of revolution about the axis at the bottoms thereof, and the annular gap between the mutually opposing peripheries of the members being open ended at one axial end of the pair of members, an abutment which is engageable with the respective race defining members at the other axial end of the pair of members to maintain the races in mutual opposition to one another when the members are rotated in relation to one another, and means for supporting the outer race defining member so that it can be deflected angularly from the plane of relative rotation in the direction relatively toward the aforesaid other axial end of the pair of members from the one axial end thereof, to the extent that the set of rolling elements can be inserted in the gap at a point in the end opening thereof, and then restored to the plane of relative rotation to rotatably interengage the rolling elements between the members at the surfaces of the races, and interconnect the pair of members so that when they are rotated in relation to one another, sliding friction of the members is converted to rotating friction by the rolling elements.

28. The apparatus according to claim 27 wherein the inner race defining member has an annular recess therein, and the abutment takes the form of a tailstock which is disposed on the axis of the jig and has an axially extending spindle thereon about which the members are telescopically engaged in abutment with the tailstock when assembled on the jig.

29. The apparatus according to claim 28 wherein the tailstock has an annular surface thereon which is disposed about the axis of the jig at a radius of the outer race defining member and resiliently deflectable axially of the jig when an axial force is applied to the same at a point on the circumference thereof, so that the outer race defining member can be angularly deflected from the plane of relative rotation by such a force for the insertion of the rolling elements in the assembly, and then restored to the plane to interengage the elements between the members when the force is released.

30. The apparatus according to claim 29 wherein the tailstock has a stop at one axial end of the spindle, and the surface of the tailstock is defined by an annular guide which is circumposed about the stop to maintain the races in mutual opposition to one another when the inner race defining member is telescopically engaged about the spindle in abutment with the stop and the relatively outer race defining member is rotated in relation to the inner race defining member on the surface of the guide.

31. The apparatus according to claim 30 wherein the tailstock further comprises a resiliently yieldable ring which is disposed on the opposite side of the guide from the spindle, and operable in the normally relaxed condition thereof to bias the surface of the guide into a plane perpendicular to the axis of the jig, but capable of bowing concavely at the inner peripheral edge portion thereof when axial forces are applied to the same through the body of the guide, and wherein the guide has a resiliently compressible body which bows convexly, transverse the axis of the jig, when compressed against the inner peripheral edge portion of the ring by an axial force that is applied eccentrically of the axis to a point on the surface of the guide at one circumferential side thereof, so that the surface will deflect angularly of its plane at the one circumferential side thereof when the outer race defining member is depressed against the surface at that side.

32. The according to claim 31 wherein the jig has a vertical axis of revolution, and the guide takes the form of an annular saddle which has a relatively fixed outer peripheral rim and an annular membrane of resiliently flexible material cantilevered relatively inwardly therefrom about the axis of the jig to form the inner peripheral edge portion of the saddle, and an annular pedestal that has a body and is supported on the inner peripheral edge portion of the saddle.

33. The apparatus according to claim 32 wherein the body of the pedestal has an annular groove therein which forms an outer peripheral wall on the opposite side thereof from the spindle, and the outer peripheral wall of the pedestal is resiliently convexly bendable transverse the axis of the jig when the body of the pedestal is compressed against the bias of the membrane axially of the jig to angularly deflect the surface of the pedestal as indicated.

34. The apparatus according to claim 32 further comprising a magnetizable plinth having an electric coil wrapped thereabout and a spindle upstanding thereon, and wherein the saddle is supported on the plinth and circumposed about the spindle.

35. The apparatus according to claim 32 wherein the inner race defining member has a boss thereon, and the pedestal has an annular step at the inner periphery thereof, which is circumposed about the spindle and defines a stop for the inner race defining member.

* * * * *